UNITED STATES PATENT OFFICE.

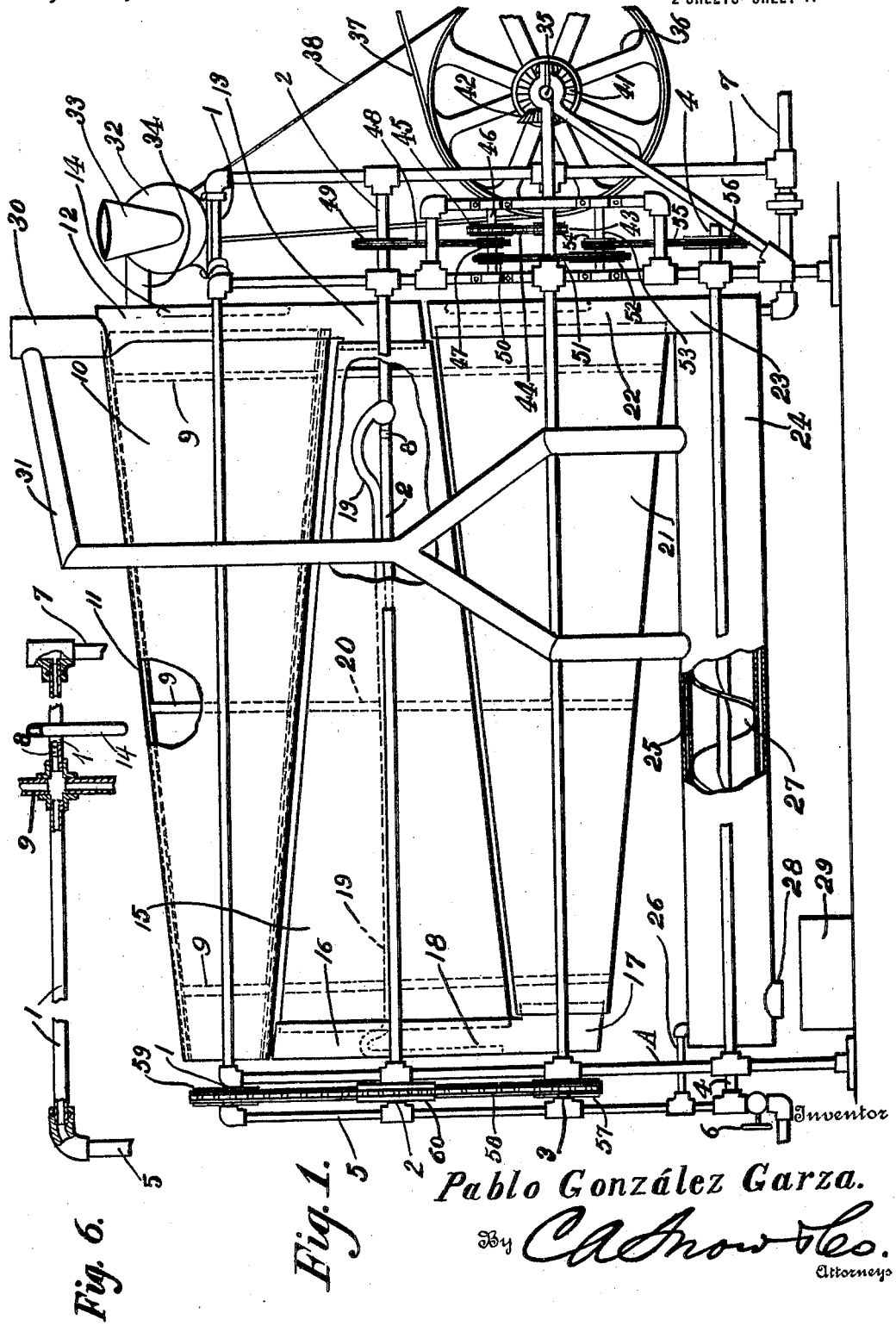

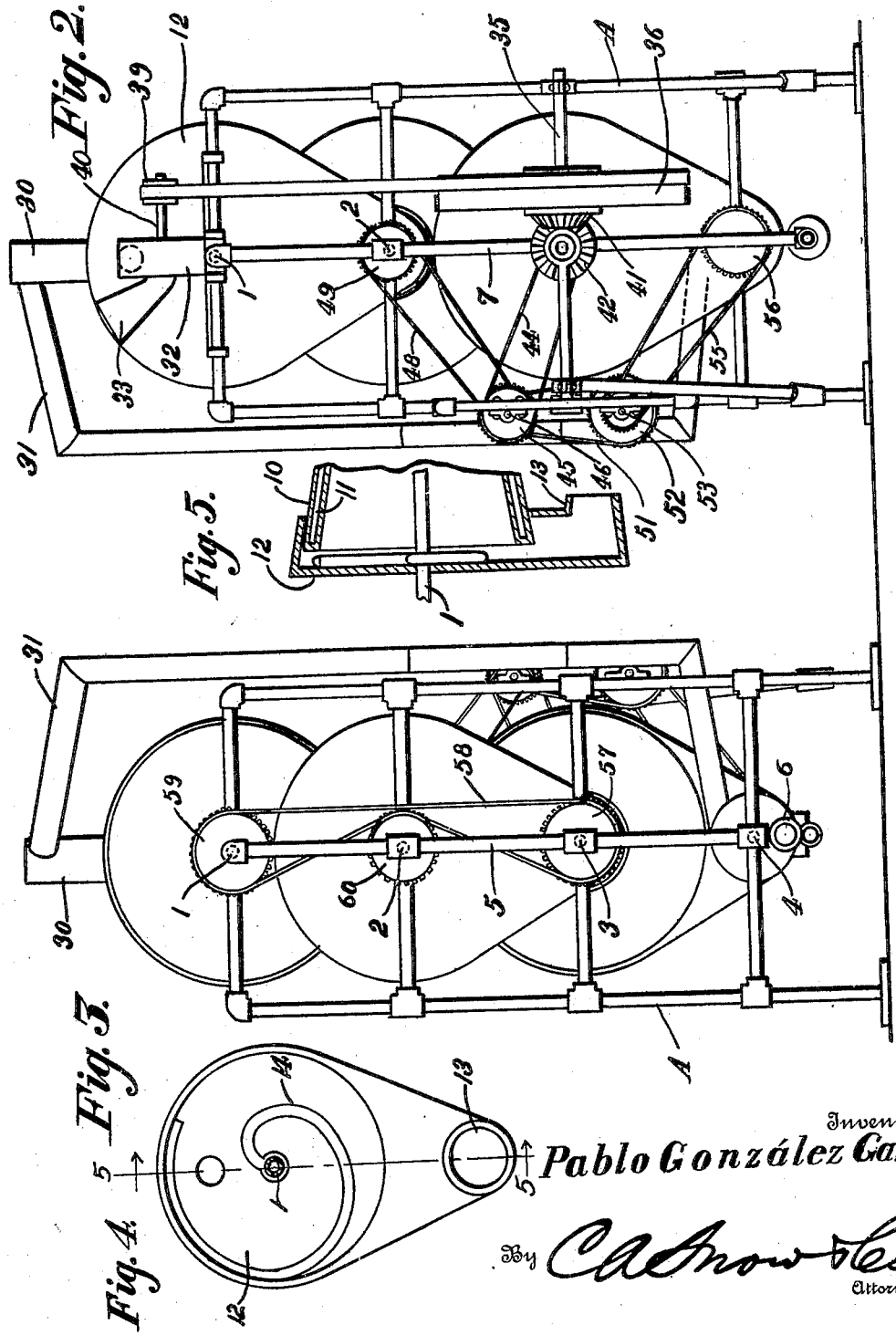

PABLO GONZÁLEZ GARZA, OF SAN ANTONIO, TEXAS.

DRIER.

1,384,996.   Specification of Letters Patent.   Patented July 19, 1921.

Application filed April 30, 1920. Serial No. 377,837.

*To all whom it may concern:*

Be it known that I, PABLO GONZÁLEZ GARZA, a citizen of the United States, residing at San Antonio, in the county of Bexar and State of Texas, have invented a new and useful Drier, of which the following is a specification.

This invention relates to drying apparatus particularly designed for use in reducing to a dried condition cereals and the like that have been ground while saturated with water. The drier is particularly useful in the production of flour from corn, it being the practice, as disclosed in Patent No. 1,334,366 to thoroughly saturate the corn or other cereals and grind it while in its saturated condition. This wet meal thus produced must subsequently be thoroughly dried prior to being reduced to a powdered or flour condition. The present invention is designed to dry the wet meal prior to the formation of the flour and one of its objects is to quickly and thoroughly drive off the moisture and at the same time keep the material being treated in a constant state of agitation so that moisture will be driven from all portions thereof.

A further object is to provide drying apparatus which is compact and efficient, and has improved means for carrying off the condensed moisture after being driven from the material being treated, there being additional means for removing vapor from the drier.

A further object is to provide a drier which will heat the material both along the center of each drying unit and also at the periphery thereof.

A further object is to provide means for scattering the material when directed into the drier so that it will be deposited in small particles and not in bulk, thus greatly facilitating the drying operation.

With the foregoing and other objects in view, which will appear as the description proceeds, invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the machine, parts being broken away.

Fig. 2 is an elevation of one end thereof.

Fig. 3 is an elevation of the other end thereof.

Fig. 4 is an inner elevation of one of the delivery heads of the drier and showing the moisture removing funnel operating thereon.

Fig. 5 is a section on line 5—5, Fig. 4, a portion of the revoluble cone being shown.

Fig. 6 is a detail view of one of the shafts and certain of the parts adjacent thereto.

Referring to the figures by characters of reference A designates a supporting structure preferably made of pipes forming standards and connecting rails and journaled in this structure are superposed parallel shafts 1, 2, 3, and 4 each of which is formed of pipe. All of the shafts mentioned are connected at one end, to a steam supply pipe 5 having a suitable valve 6 while the opposite ends of the pipes 1, 2 and 3 are connected to a drain pipe 7. Each of the shafts 1, 2 and 3 has a plug 8 seated therein so as to divide the interior of the shaft into a steam containing portion and a water containing or draining portion. The shafts may be connected to the pipes 5 and 7 in any suitable manner so as to permit them to rotate and at the same time maintain tight joints at their points of connection.

Secured to the shaft 1 are spiders 9 carrying a conical drum 10 having a double wall forming a steam jacket 11 and the arms of one or more of the spiders 9 constitute pipes for conducting steam from the tubular shaft 1 to the jacket 11. The small end of the drum is closed while the large end is open and projects into a delivery head 12 having a downwardly extending outlet spout 13. Mounted on the tubular shaft 1 is a spiral scraper 14 which is channeled longitudinally and is adapted, during the rotation of the shaft 1 and its drum, to scrape the inner surface of the delivery head 12 so as to remove therefrom any water of condensation and cause the same to flow along the channeled spiral scraper and to discharge into the draining end portion of the shaft 1.

Mounted on the shaft 2 and directly under the shaft 1 is another conical drum 15 arranged oppositely to the drum 10 and the small end of which is adapted to receive material from the delivery spout 13. Another delivering head 16 houses the large open end of the drum 15 and has a delivering spout 17 similar to the spout 13. A moisture collecting spiral 18 similar to the one shown at 14 works upon the inner surface of the head 16 and is connected, by a pipe 19, to the draining end portion of the shaft 2. This drum 15 is also provided with a steam jacket such as shown at 11, one or more of the arms of the spiders constituting means for conducting steam from the shaft 2 to the steam jacket. One of these tubular arms of the drum 15 has been indicated at 20.

The delivery spout 17 serves to direct material into the small end of another conical drum 21 mounted on the shaft 3 and which is of the same construction as the drum 10 and has its large open end rotating within a delivering head 22. The outlet spout 23 of this head opens into one end of a cylindrical casing 24 arranged under the drum 21 and provided with a steam jacket 25 to which steam is applied in any suitable manner from the pipe 5, as through a branch pipe 26. The shaft 4 has a worm conveyer 27 secured to it and that end of the cylindrical casing 24 remote from the spout 23 has an outlet 28 adapted to direct dried material into a suitable container 29.

Extending from the upper portion of the head 12 is an outlet flue 30 for vapor and opening into this flue is another outlet flue 31 extending from the top portion of the casing or housing 24, the lower portion of this flue 31 being preferably branched or forked as shown.

A blower casing 32 is mounted adjacent the head 12 and has a hopper 33 opening into one side thereof.

A delivery pipe 34 extends from the outlet of the casing 32 and opens through the upper portion of the head 12, and a blower, not shown, is mounted in the casing 32 and is adapted to suck air through the hopper 33 and to discharge it through pipe 34 into the upper drum 10.

A main drive shaft 35 is journaled on the structure A and has a pulley 36 adapted to receive motion, through a belt 37, from a suitable motor, not shown. A belt 38 transmits motion from this pulley to the pulley 39 of the shaft 40 of the blower. A gear 41 rotates with the pulley 36 and meshes with a gear 42 secured to the shaft 3. On this shaft is attached a sprocket 43 which transmits motion through a chain 44 to a sprocket 45 secured to a counter shaft 46. Another sprocket 47 is secured to the counter shaft and transmits motion through a chain 48 to a sprocket 49 on the shaft 2. A third sprocket 50 is secured to the counter shaft and transmits motion through a chain 51 to a sprocket 52 on a second counter shaft 53 and motion is transmitted from this counter shaft through a sprocket 54, chain 55 and sprocket 56 to the shaft 4. A sprocket 57 is secured to the other end of the shaft 3 and transmits motion through a chain 58 to a sprocket 59 secured to the shaft 1, there being an idler sprocket 60 engaging the chain 58.

In using the apparatus herein described the saturated meal is fed through the hopper 33 into the housing of the blower and the blower, operating on this material, throws it into the upper drum 10 which is rotating and scatters it throughout the area thereof. The material thus scattered will be heated by the wall of the drum and also by the heat radiating from the steam containing portion of the shaft 1 and the moisture driven off in this manner will to a large extent escape by way of the flue 30 although some of it will become condensed upon the head 12. This condensed moisture will be gathered up by the spiral collecting member 14 and directed into the draining end of the shaft 1 from which it will flow downwardly through the pipe 7. As the drum is inclined the material as it dries will work downwardly to the head 12 and be discharged through spout 13 into the second drum 15 along which it will work into the third drum 21 and thence into the receiving end of the housing or casing 24 where it will be engaged by the spiral conveyer and conducted to the outlet 28. As the material passes successively through the drums it will of course be further heated in view of the fact that each of the drums has a steam jacket and has a central steam containing shaft. Consequently when the material is discharged into the container 29 it will be thoroughly dried and can be easily reduced to a fine powder or flour. Obviously any moisture condensing upon any one of the heads 12, 16, or 22 will be collected in the manner described with reference to the spiral 14 and will be directed into the adjacent tubular shaft and carried off through the drain pipe 7. Any moisture contained in the housing or casing 24 and which may be driven off by the heat, will be carried away as vapor through the flue 31.

What is claimed is:

1. Drying apparatus of the character described including a conical drum mounted for rotation, a steam jacket upon the wall of the drum, a steam containing shaft longitudinally within and revoluble with the drum, a delivering head at one end of the drum, a blower casing discharging through the head and means for directing saturated material to be dried into said casing to be scattered by an air blast longitudinally within the drum.

2. A drying apparatus of the class described including superposed oppositely arranged tapered drums, means for rotating the drums, a stationary delivering head at the large end of each drum for directing material into the small end of the next adjoining drum thereunder, a drain pipe in communication with a portion of the shaft of each of the drums, means revoluble with the shaft and drum for removing condensed moisture from the delivering heads and directing it into the drain pipe, means for scattering saturated material broadcast within one of the drums, and a vapor outlet flue extending from said drum.

3. A drying apparatus of the class described including superposed oppositely arranged tapered drums, means for rotating the drums, a stationary delivering head at the large end of each drum for directing material into the small end of the next adjoining drum thereunder, a drain pipe in communication with a portion of the shaft of each of the drums, means revoluble with the shaft and drum for removing condensed moisture from the delivering heads and directing it into the drain pipe, means for scattering saturated material broadcast within one of the drums, a housing for receiving material from the lowermost drum, a steam jacket upon the housing, a conveying worm within the housing, and a vapor outlet flue in communication with said housing and with the uppermost drum.

In testimony that I claim the foregoing as my own, I have hereto affixed my signature.

PABLO GONZÁLEZ GARZA.